March 15, 1949. J. L. AASLAND 2,464,477
SLIP CLUTCH
Filed Aug. 30, 1946 2 Sheets-Sheet 1
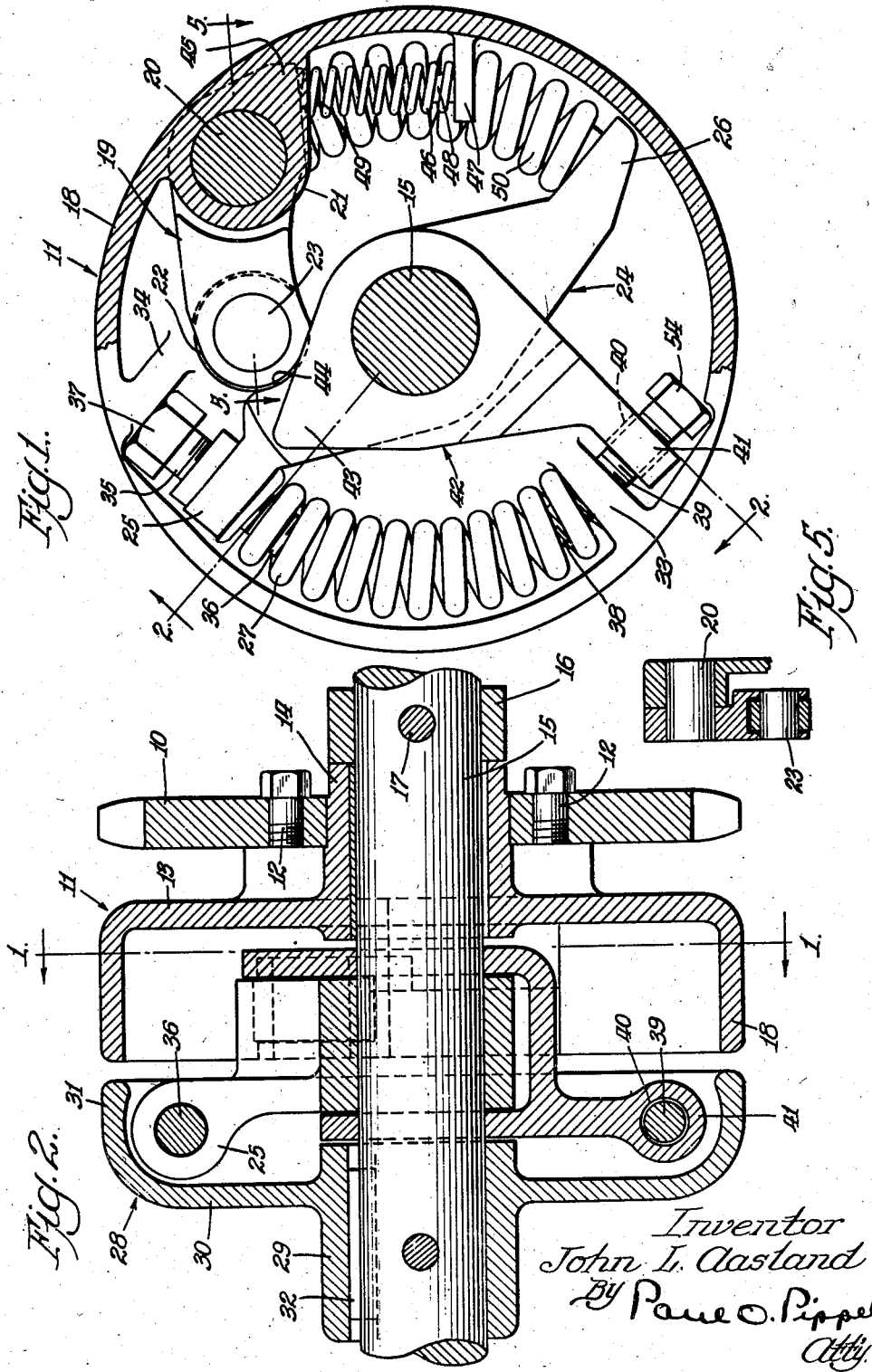
Inventor
John L. Aasland
By Paul O. Pippel
Atty.

March 15, 1949.                J. L. AASLAND                2,464,477
                                SLIP CLUTCH
Filed Aug. 30, 1946                                   2 Sheets-Sheet 2
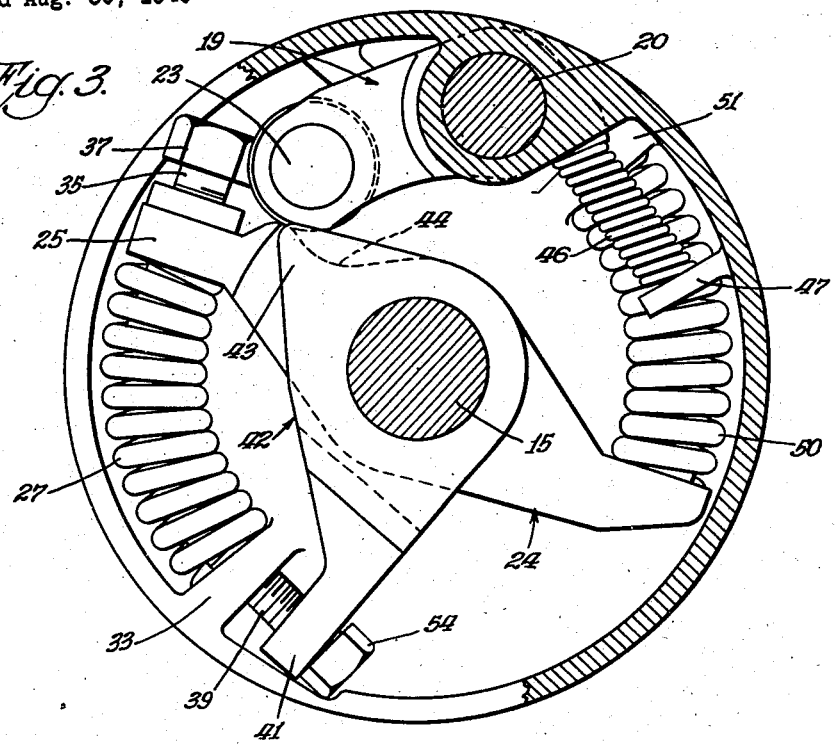
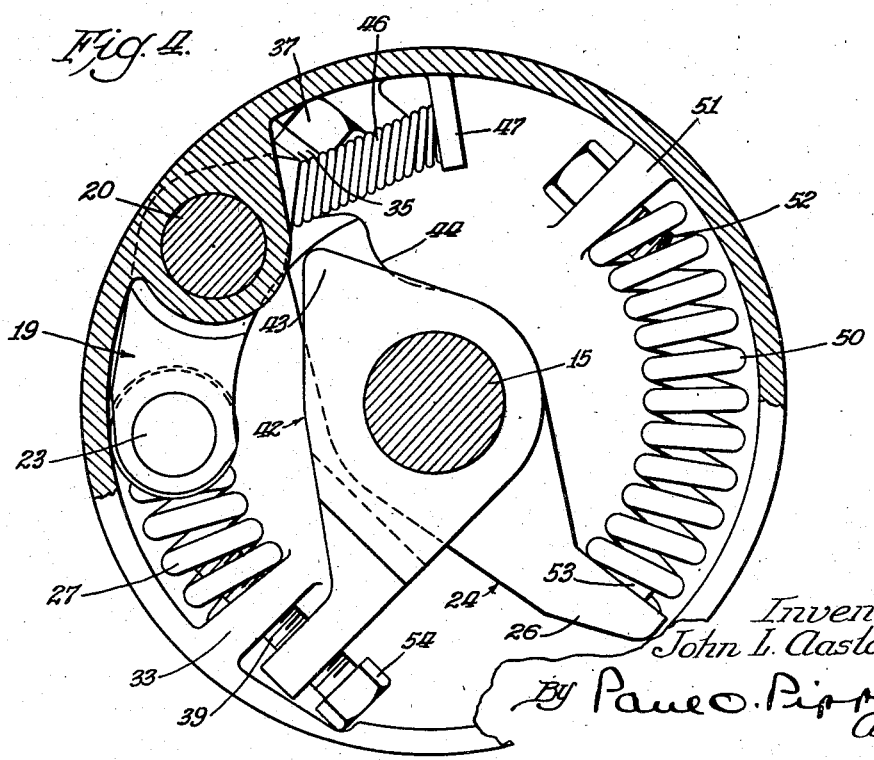
Inventor
John L. Aasland
By Paul O. Pippel
Atty Patented Mar. 15, 1949

2,464,477

UNITED STATES PATENT OFFICE 2,464,477

SLIP CLUTCH

John L. Aasland, Moline, Ill., assignor to International Harvester Company, a corporation of New Jersey Application August 30, 1946, Serial No. 693,929

17 Claims. (Cl. 192—56)

1

This invention relates to a new and improved slip clutch. More particularly it relates to a clutch adapted to yield and slip upon the attainment of a predetermined maximum load.

An important object of this invention is to provide a slip clutch combining the principles of a spring-held unit and centrifugal force to cause the clutch to slip upon any predetermined force.

Another important object of this invention is the provision of a positively actuated slip clutch which may yield when an excessive load is being transmitted thereby and which will automatically re-set itself after it has slipped and the speed has been diminished.

Other and further important objects of this invention will become apparent from the disclosures in the following specification and accompanying drawings, in which:

Figure 1 is a transverse sectional view taken through the slip clutch of this invention and may be described as taken on the line 1—1 of Figure 2.

Figure 2 is a sectional view taken on the line 2—2 of Figure 1.

Figure 3 is a sectional view similar to Figure 1 showing the clutch being released.

Figure 4 is a sectional view similar to Figures 1 and 3 with the clutch in slipping position.

Figure 5 is a sectional view taken on the line 5—5 of Figure 1.

As shown in the drawings:

The reference numeral 10 indicates generally a driving sprocket having a cup-like housing member 11 bolted thereto at 12. This housing member 11 comprises a disk-like wall 13 having an integral sleeve bearing member 14 journaled on a shaft 15. A retaining collar 16 is fastened to the shaft 15 by means of a pin 17 and prevents the sprocket and integral housing 11 from moving axially of the one end of the housing 15. The housing 11 is provided with an annular flange 18 at the outer edge of the disk 13 and is formed in a direction away from the driving sprocket 10. The housing or hub 11 carries a dog 19. This dog 19 is hinged on a pin 20 supported within spaced journal brackets 21 integral with the hub 11. The dog 19 is equipped with a roller member 22 mounted for rotation at 23 on the outer end of the dog 19.

A spring compressor 24 is journaled about the shaft 15 and has substantially diametrically opposed arms 25 and 26. One side of the arm 25 is adapted to bear against a coil spring 27 mounted in an arcuate position within a housing 28 as best shown in Figure 2. The housing or hub 28

2 has a sleeve portion 29, a radially extending disk-like wall 30, and an annular flange 31 bent toward the annular flange 18 on the housing or hub 11. The space between the inner ends of the flanges 18 and 31 is relatively slight and thus tends to substantially enclose the working elements of the slip clutch so that dust and other foreign objects are prevented from affecting the operation of this slip clutch.

The sleeve member 29 of the housing 28 is fastened to the shaft 15 by means of a key 32. Thus it will be seen that as the housing 28 is rotated this rotation will be imparted to the shaft 15. Ear members 33 and 34 are provided within the housing 28 and define the space within which the spring 27 is positioned. A member 35 threadedly engages and passes through the outer end of the arm 25 of the spring compressor member 24. The end of the screw 36 enters the coil spring 27 thus serving to hold the spring in its fixed relationship with respect to the arm 25. The screw 35 has a head 37 which abuts against the lug or ear 34 in the housing 28. The screw thus acts as a set screw and definitely positions the spring compressor member 24 with respect to the shaft 25 prior to actual operation of the slip clutch. The other end of the spring is held or guided by the end 38 of a screw 39. The screw 39 threadedly engages the ear or lug 33 in the housing 28 and passes through an enlarged aperture 40 in an arm 41 of a dog releasing member 42 journaled on the shaft 15 in the same manner as the spring compressor member 24.

The dog releasing member 42 is equipped with a tapered arm 43 at substantially right angles to the arm 41 and contacts the dog member 19. The roller member 22 normally rests in a socket 44 in one side of the arm 25 of the spring compressing member 24. The socket 44 is of such a shape that as the housing 11 rotates the dog 19 will impart rotational drive to the housing 28, thus causing drive of the shaft 15. The dog 19 is provided with a rearwardly extending portion 45 beyond its center of pivot, and a spring 46 held by a lug or ear 47 formed integrally with the housing 11 and having a stud 48 extending upwardly therefrom is adapted to exert an upward force thereagainst which provides a downward force on the socket engaging end of the dog. The spring 46 is guided at its upper end by a stud 49 extending down from the rearwardly extending portion 45 of the dog 19. Another spring 50 corresponds to the spring 27 and is adapted to supplement this spring so that rotation of the spring compressing member 24 about the shaft 15 must necessarily compress both springs 27 and 50. As best shown in Figure 4, the spring 50 is confined within the housing 28 in the same manner as the spring 27 and between a lug or ear 51 and the end of the spring compressing arm 26. Guide studs 52 and 53 are provided on the lug 51 and arms 26, respectively, to maintain the spring in the position shown. The spring 46 is considerably lighter than the springs 27 and 50 and does not require as great a force to effect compression.

In operation the slip clutch functions in a manner similar to that as described for the device shown in Figure 1. The dog 19 drives the spring compressing member 24 by its engagement with the socket 44, and this rotational movement is imparted through the springs 27 and 50 to the housing 28, which as previously stated is keyed to the shaft 15 and hence drives the shaft 15. When a load is applied to the driven shaft 15 there is a tendency to compress the springs 27 and 50. As this load is increased it will eventually exceed the maximum load desired and as shown in Figure 3 this condition has just been reached. The dog releasing member 42 is permitted slight movement along the screw 39. However, it is limited by the head of the screw 54. As shown in Figure 3, the arm 41 of this dog releasing member 42 has had its movement stopped by abutment against the head 54 of the screw 39. Continued compression of the springs 27 and 50 by the compressor member 24 has advanced the relative position of the spring compressing member 24 with respect to the dog releasing member 42. Thus the socket 44 in the surface of the arm 25 of the spring compressing member 24 has been in effect eliminated by the taper arm 43 of this dog releasing member 42. The dog 19 is thus raised about its hinge pin 20 against the action of the spring 46, and immediately upon its withdrawal from the socket 44 it is permitted to swing outwardly by centrifugal force to the position shown in Figure 4. The driving dog 19 now no longer imparts rotation to any member, and the spring compressing member 24 and the dog releasing member 42 are permitted to resume their normal positions as shown in Figure 1 of the drawings. As shown in Figure 4, the angular movement of the spring 46 is such that it now is in substantial alinement with the center of the hinge pin 20, thus minimizing the effect of the spring in causing the dog to resume its inward position in the socket 44. However, just as soon as the speed of the driving sprocket and housing 10 and 11, respectively, is reduced the centrifugal force becomes less effective, and when the weakened action of the spring 46 becomes greater than this reduced centrifugal force, the dog 19 is forced inwardly to its position in the socket 44. Driving of the device may then be resumed without manual setting of any parts, and the device then functions again as a slip clutch device.

The force at which the clutch slips is determined by the strength of the springs 27 and 50, and it will be evident that these springs may be replaced with heavier or lighter springs, as desired, to accomplish slipping of the clutch upon the attainment of any predetermined force.

Numerous details of construction may be varied throughout a wide range without departing from the principles disclosed herein, and I therefore do not propose limiting the patent granted hereon otherwise than as necessitated by the appended claims.

What is claimed is:

1. A clutch mechanism comprising a rotary driving member, a rotary driven member adjacent to and in axial alignment with said driving member, a shaft positioned axially of said members, said driven member fastened to said shaft for rotation therewith, first and second members journaled on said shaft, spring means interposed between the first of said members and said driven member, said first member having a socket therein, hinged dog means on said driving member having a portion adapted to engage the socket in said first member and impart drive to said driven member through the spring means, said spring means being compressed to a degree commensurate with the load of the driven member, said second member associated with and movable with respect to said driven member a lesser degree than said first member, and said second member adapted to pass the socket in said first member when the first member has compressed the spring means and has moved a greater distance with respect to said driven member than said second member, whereby the dog means is forced from the socket by the second member thus causing the drive to stop.

2. A clutch mechanism comprising a rotary driving member, a rotary driven member adjacent to and in axial alignment with said driving member, a shaft positioned axially of said members, said driven member fastened to said shaft for rotation therewith, first and second members journaled on said shaft, spring means interposed between the first of said members and said driven member, said first member having a socket therein, hinged dog means on said driving member having a portion adapted to engage the socket in said first member and impart drive to said driven member through the spring means, said spring means being compressed to a degree commensurate with the load of the driven member, said second member associated with and movable with respect to said driven member a lesser degree than said first member, said second member adapted to pass the socket in said first member when the first member has compressed the spring means and has moved a greater distance with respect to said driven member than said second member, whereby the dog means is forced from the socket by the second member thus causing the drive to stop, and another spring means arranged and positioned to normally hold and urge said dog in socket engaging position.

3. A clutch mechanism comprising a rotary driving member, a rotary driven member adjacent to and in axial alignment with said driving member, a shaft positioned axially of said members, said driven member fastened to said shaft for rotation therewith, first and second members journaled on said shaft, spring means interposed between the first of said members and said driven member, said first member having a socket therein, hinged dog means on said driving member having a portion adapted to engage the socket in said first member and impart drive to said driven member through the spring means, said spring means being compressed to a degree commensurate with the load of the driven member, said second member associated with and movable with respect to said driven member a lesser degree than said first member, said second member adapted to pass the socket in said first member when the first member has compressed the spring means and has moved a greater distance with respect to said driven member than said second member, whereby the dog means is forced from the socket by the second member thus causing the drive to stop, said hinged dog means having a portion extending rearwardly of the hinge point opposite the socket engaging portion, and a spring arranged to exert an upward force on said rearwardly extending portion and a downward force on said socket engaging portion.

4. A clutch mechanism comprising a rotary driving member, a rotary driven member adjacent to and in axial alignment with said driving member, a shaft positioned axially of said members, said driven member fastened to said shaft for rotation therewith, first and second members journaled on said shaft, spring means interposed between the first of said members and said driven member, said first member having a socket therein, hinged dog means on said driving member having a portion adapted to engage the socket in said first member and impart drive to said driven member through the spring means, said spring means being compressed to a degree commensurate with the load of the driven member, said second member associated with and movable with respect to said driven member a lesser degree than said first member, said second member adapted to pass the socket in said first member when the first member has compressed the spring means and has moved a greater distance with respect to said driven member than said second member, whereby the dog means is forced from the socket by the second member thus causing the drive to stop, said hinged dog means having a portion extending rearwardly of the hinge point opposite the socket engaging portion, and a spring arranged to exert an upward force on said rearwardly extending portion and a downward force on said socket engaging portion, whereby when the dog means is forced out of the socket centrifugal force created by rotary motion of the members throws the dog means outwardly against the action of the spring and the dog means remains outwardly until such time as the speed is reduced sufficiently so that the centrifugal force is overcome by the action of the spring forcing the dog back into engagement with the socket whereupon driving through the clutch is resumed.

5. A clutch mechanism comprising a shaft to be driven, a driving hub member journaled for rotational movement on said shaft, a driven hub member fastened to said shaft for rotational movement therewith, each of said hubs having annular flanges turned inwardly toward each other and terminating closely adjacent each other, whereby the hubs and inturned flanges form a substantially enclosed housing, means positioned between and associated with said hubs for imparting drive from the driving hub to the driven hub, said means including a cross arm journaled on the shaft and extending outwardly to a position adjacent the inturned flanges, ears integral with the inturned flange of the driven member, a coil spring curved to fit within the annular pocket formed by the flanged driven hub, one end of said spring abutting one of said ears and one end of the cross arm abutting the other end of the spring, and cross arm engaging means associated with said driving hub to effect a driving of the driven hub through the spring.

6. A clutch mechanism comprising a shaft to be driven, a driving hub member journaled for rotational movement on said shaft, a driven hub member fastened to said shaft for rotational movement therewith, each of said hubs having annular flanges turned inwardly toward each other and terminating closely adjacent each other, whereby the hubs and inturned flanges form a substantially enclosed housing, means positioned between and associated with said hubs for imparting drive from the driving hub to the driven hub, said means including a cross arm journaled on the shaft and extending outwardly to a position adjacent the inturned flanges, ears integral with the inturned flange of the driven member, a coil spring curved to fit within the annular pocket formed by the flanged driven hub, one end of said spring abutting one of said ears and one end of the cross arm abutting the other end of the spring, cross arm engaging means associated with said driving hub to effect a driving of the driven hub through the spring, and means associated with said cross arm to cause a disengagement of said engaging means at a time when the cross arm compresses the spring more than some predetermined minimum.

7. A clutch mechanism comprising a shaft to be driven, a driving hub member journaled for rotational movement on said shaft, a driven hub member fastened to said shaft for rotational movement therewith, each of said hubs having annular flanges turned inwardly toward each other and terminating closely adjacent each other, whereby the hubs and inturned flanges form a substantially enclosed housing, means positioned between and associated with said hubs for imparting drive from the driving hub to the driven hub, said means including a cross arm journaled on the shaft and extending outwardly to a position adjacent the inturned flanges, ears integral with the inturned flange of the driven member, a coil spring curved to fit within the annular pocket formed by the flanged driven hub, one end of said spring abutting one of said ears and one end of the cross arm abutting the other end of the spring, dog means hinged internally of said driving hub, said cross arm having a socket therein, a portion of said dog means normally engaging said socket and effecting a driving of the driven member by the driving member, and means for disengaging said dog means from said socket upon too great a load being applied to the driven hub.

8. A clutch mechanism comprising a shaft to be driven, a driving hub member journaled for rotational movement on said shaft, a driven hub member fastened to said shaft for rotational movement therewith, each of said hubs having annular flanges turned inwardly toward each other and terminating closely adjacent each other, whereby the hubs and inturned flanges form a substantially enclosed housing, means positioned between and associated with said hubs for imparting drive from the driving hub to the driven hub, said means including a cross arm journaled on the shaft and extending outwardly to a position adjacent the inturned flanges, ears integral with the inturned flange of the driven member, a coil spring curved to fit within the annular pocket formed by the flanged driven hub, one end of said spring abutting one of said ears and one end of the cross arm abutting the other end of the spring, dog means hinged internally of said driving hub, said cross arm having a socket therein, a portion of said dog means normally engaging said socket and effecting a driving of the driven member by the driving member, and means responsive to compression of the spring for disengaging said dog means from said socket.

9. A clutch mechanism comprising a shaft to be driven, a driving hub member journaled for rotational movement on said shaft, a driven hub member fastened to said shaft for rotational movement therewith, each of said hubs having annular flanges turned inwardly toward each other and terminating closely adjacent each other, whereby the hubs and inturned flanges form a substantially enclosed housing, means positioned between and associated with said hubs for imparting drive from the driving hub to the driven hub, said means including a cross arm journaled on the shaft and extending outwardly to a position adjacent the inturned flanges, ears integral with the inturned flange of the driven member, a coil spring curved to fit within the annular pocket formed by the flanged driven hub, one end of said spring abutting one of said ears and one end of the cross arm abutting the other end of the spring, dog means hinged internally of said driving hub, said cross arm having a socket therein, a portion of said dog means normally engaging said socket and effecting a driving of the driven member by the driving member, and means responsive to compression of the spring for disengaging said dog means from said socket, said last-named means including a member journaled on said shaft adjacent the cross arm and having relative movement with respect to the driven hub in an amount less than the distance the spring compresses, whereby the member is arranged and constructed to assume occupation of said socket when the spring is compressed substantially its full amount and thus remove the dog means from the socket.

10. A clutch mechanism comprising a shaft to be driven, a driving hub member journaled for rotational movement on said shaft, a driven hub member fastened to said shaft for rotational movement therewith, each of said hubs having annular flanges turned inwardly toward each other and terminating closely adjacent each other, whereby the hubs and inturned flanges form a substantially enclosed housing, means positioned between and associated with said hubs for imparting drive from the driving hub to the driven hub, said means including a cross arm journaled on the shaft and extending outwardly to a position adjacent the inturned flanges, ears integral with the inturned flange of the driven member, a coil spring curved to fit within the annular pocket formed by the flanged driven hub, one end of said spring abutting one of said ears and one end of the cross arm abutting the other end of the spring, dog means hinged internally of said driving hub, said cross arm having a socket therein, a portion of said dog means normally engaging said socket and effecting a driving of the driven member by the driving member, means responsive to compression of the spring for disengaging said dog means from said socket, said last-named means including a bell-crank member journaled on said shaft and having one arm adjacent the socket in the cross arm, said bell-crank member having another arm extending outwardly from its journal on the shaft, and means for limiting the rotational movement of the bell-crank member separately from the driven member, whereby the movement of the cross arm by compression of the spring an amount in excess of the permitted movement of the bell-crank member causes the bell-crank member to expel the dog means.

11. A clutch mechanism comprising a shaft to be driven, an annular driving housing journaled for rotational movement on said shaft, a driven housing member fastened to said shaft for rotation therewith, each of said housings having inturned annular flanges terminating closely adjacent each other, whereby the two housings supplement each other to form a substantially complete clutch mechanism housing, means arranged and constructed within said housings to drive the driven housing by the driving housing and to automatically terminate said driving upon the driven load becoming excessive of any predetermined level, said means including inwardly extending ears spaced around said driven housing, a cross member journaled at its center and hinge arms extending radially outwardly in opposite directions, coil spring means positioned between each of said arms and one of said inwardly extending ears and said spring means shaped to conform to the annular housing, and hinged dog means on said driving housing to engage and drive said cross member.

12. A clutch mechanism comprising a shaft to be driven, an annular driving housing journaled for rotational movement on said shaft, a driven housing member fastened to said shaft for rotation therewith, each of said housings having inturned annular flanges terminating closely adjacent each other, whereby the two housings supplement each other to form a substantially complete clutch mechanism housing, means arranged and constructed within said housings to drive the driven housing by the driving housing and to automatically terminate said driving upon the driven load becoming excessive of any predetermined level, said means including inwardly extending ears spaced around said driven housing, a cross member journaled at its center and hinge arms extending radially outwardly in opposite directions, coil spring means positioned between each of said arms and one of said inwardly extending ears and said spring means shaped to conform to the annular housing, said cross member having a socket therein, a dog hinged to said driving housing and having a portion engaging said socket, and a spring engaging a portion of said dog on the other side of said hinge point, whereby the dog is normally urged to socket engaging position.

13. A clutch mechanism comprising a shaft to be driven, an annular driving housing journaled for rotational movement on said shaft, a driven housing member fastened to said shaft for rotation therewith, each of said housings having inturned annular flanges terminating closely adjacent each other, whereby the two housings supplement each other to form a substantially complete clutch mechanism housing, means arranged and constructed within said housings to drive the driven housing by the driving housing and to automatically terminate said driving upon the driven load becoming excessive of any predetermined level, said means including inwardly extending ears spaced around said driven housing, a cross member journaled at its center and hinge arms extending radially outwardly in opposite directions, coil spring means positioned between each of said arms and one of said inwardly extending ears and said spring means shaped to conform to the annular housing, said cross member having a socket therein, a dog hinged to said driving housing and having a portion engaging said socket, a spring engaging a portion of said dog on the other side of said hinge point, whereby the dog is normally urged to socket engaging position, and a bell-crank shaped member journaled on said shaft adjacent the cross member, and having a portion movable past the socket in the cross member, whereby the dog is forced from the socket against the action of its spring and centrifugal force created by rotation of the driving housing throws the dog outwardly against its inturned flange where it remains until the speed has reduced sufficiently to permit the dog spring to overcome the centrifugal force.

14. A clutch mechanism comprising a shaft to be driven, an annular driving housing journaled for rotational movement on said shaft, a driven housing member fastened to said shaft for rotation therewith, each of said housings having inturned annular flanges terminating closely adjacent each other, whereby the two housings supplement each other to form a substantially complete clutch mechanism housing, means arranged and constructed within said housings to drive the driven housing by the driving housing and to automatically terminate said driving upon the driven load becoming excessive of any predetermined level, said means including inwardly extending ears spaced around said driven housing, a cross member journaled at its center and hinge arms extending radially outwardly in opposite directions, coil spring means positioned between each of said arms and one of said inwardly extending ears and said spring means shaped to conform to the annular housing, said cross member having a socket therein, a dog hinged to said driving housing and having a portion engaging said socket, a spring engaging a portion of said dog on the other side of said hinge point, whereby the dog is normally urged to socket engaging position, and a bell-crank shaped member journaled on said shaft adjacent the cross member, said bell-crank shaped member having one arm in substantial alignment with the arm of the cross member having the socket, and having another arm associated with an ear on said driven housing and means for adjusting it with respect thereto.

15. A clutch mechanism comprising a shaft to be driven, an annular driving housing journaled for rotational movement on said shaft, a driven housing member fastened to said shaft for rotation therewith, each of said housings having inturned annular flanges terminating closely adjacent each other, whereby the two housings supplement each other to form a substantially complete clutch mechanism housing, means arranged and constructed within said housings to drive the driven housing by the driving housing and to automatically terminate said driving upon the driven load becoming excessive of any predetermined level, said means including inwardly extending ears spaced around said driven housing, a cross member journaled at its center and hinge arms extending radially outwardly in opposite directions, coil spring means positioned between each of said arms and one of said inwardly extending ears and said spring means shaped to conform to the annular housing, said cross member having a socket therein, a dog hinged to said driving housing and having a portion engaging said socket, a spring engaging a portion of said dog on the other side of said hinge point, whereby the dog is normally urged to socket engaging position, and a bell-crank shaped member journaled on said shaft adjacent the cross member, said bell-crank shaped member having one arm in substantial alignment with the arm of the cross member having the socket, and having another arm associated with an ear on said driven housing and means for adjusting it with respect thereto, said means for adjusting comprising a threaded bolt with a head, said bolt threadedly engaging said ear, and said other bell-crank shaped arm having an aperture sufficiently large to permit passage of the bolt shank but not the bolt head, whereby adjustment is accomplished by screwing the bolt into or out of the ear thus controlling maximum movement of the bell-crank shaped member with respect to said driven housing.

16. A clutch comprising a driving member, a driven member, a dog hinged to said driving member, a member movable within predetermined limits with respect to said driven member, said movable member having a socket therein, and whereby said dog engages said socket and imparts drive from the driving member to the driven member, and means for causing disengagement of said dog from said socket and ceasing the driving of the driven member by the driving member upon the attempt to transmit too great a load.

17. A clutch comprising a driving member, a driven member, means for imparting drive from the driving member to the driven member including spring means, a member for compressing said spring means, means dependent upon the amount of spring compression for causing the clutch to yield, said last-named means comprising a second member adjacent said spring compressing member and arranged and constructed to move a lesser amount than the spring compresses, and a dog hinged on said driving member and adapted to engage and directly drive said compressing member, whereby when the spring is compressed a predetermined amount dependent upon the driven load, the dog is separated from said compressing member the said second member stopping its relative movement with respect to the driven member prior to the stopping of the spring compressing member.

JOHN L. AASLAND.

REFERENCES CITED

The following references are of record in the file of this patent:

UNITED STATES PATENTS

| Number | Name | Date |
|---|---|---|
| 974,402 | Levey | Nov. 1, 1910 |
| 1,550,817 | Karge | Aug. 28, 1925 |
| 1,862,888 | Ellersgaard | June 14, 1932 |
| 1,883,225 | Wood | Oct. 18, 1932 |
| 2,202,497 | Landahl | May 28, 1940 |